United States Patent

[11] 3,622,567

| [72] | Inventor | Raj Kumer Razdan |
| | | Belmont, Mass. |
| [21] | Appl. No. | 728,819 |
| [22] | Filed | May 13, 1968 |
| [45] | Patented | Nov. 23, 1971 |
| [73] | Assignee | Arthur D. Little Inc. |
| | | Cambridge, Mass. |

[54] NORCAMPHANE DERIVATIVES
3 Claims, No Drawings

[52] U.S. Cl. .................................................. 260/239 E,
260/557 R, 260/563 R, 424/244
[51] Int. Cl. .................................................... C07d 23/06
[50] Field of Search ............................................ 260/239 E

[56] References Cited
UNITED STATES PATENTS
3,300,480  1/1967  Narayanan ....................  260/239
OTHER REFERENCES
Elderfield, Heterocyclic Compounds, vol. 1, pp. 62– 63 (1950)

*Primary Examiner*—Alex Mazel
*Assistant Examiner*—Joseph A. Narcavage
*Attorneys*—Elmer J. Lawson, B. Woodrow Wyatt, Thomas L. Johnson, Robert K. Bair, R. Clifford Bourgeois, William G. Webb and Roger T. Wolfe ABSTRACT: New norcamphane derivatives bearing at the 3-position a 2-hydroxyethylamino, 2-haloethylamino, ethyleneimino, or cyclopropylmethylamino group, having useful hypotensive activity, and prepared, respectively, by alkylation of 3-amino-2,2,3-trimethylnorcamphane with ethylene oxide; halogenation of the resulting 3-(2-hydroxyethylamino)-2,2,3-trimethylnorcamphane; cyclization, in the presence of alkali, of the resulting 3-(2-haloethylamino)-2,2,3-trimethylnorcamphane; or acylation of 3-amino-2,2,3-trimethylnorcamphane with a cyclopropylcarbonyl halide and alkali metal aluminum hydride reduction of the resulting 3-cyclopropylcarbonylamino-2,2,3-trimethylnorcamphane.

NORCAMPHANE DERIVATIVES

This invention relates to 3-aminonorcamphane derivatives having the formula:

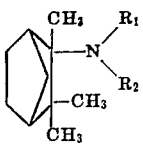

where $R_1$ is hydrogen; and $R_2$ is 2-hydroxyethyl, 2-haloethyl, or cyclopropylmethyl; or $R_1$ and $R_2$, together with the nitrogen atom to which they are attached, represent an ethyleneimino group.

The compound of formula I above where $R_1$ is hydrogen and $R_2$ is 2-hydroxyethyl is prepared by reaction of 3-amino-2,2,3-trimethylnorcamphane with ethylene oxide in an organic solvent inert under the conditions of the reaction, for example lower-alkanols, such as methanol, ethanol, isopropanol, and the like. The reaction is represented by the equation:

(I)

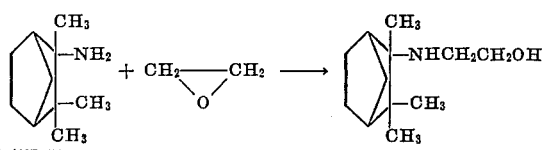

The compounds of formula I where $R_1$ is hydrogen and $R_2$ is 2-haloethyl are prepared by reacting the corresponding compound where $R_2$ is 2-hydroxyethyl with a reagent conventionally used to convert an alcohol to the corresponding halide, for example thionyl chloride in the presence of pyridine to prepare the compound where halo is chloro, or phosphorus tribromide in xylene to prepare the compound where halo is bromo. The reaction is carried out at a temperature from around 0° C. to about 120° C. and is represented by the equation:

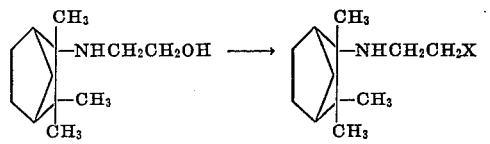

where X is halo. Alternatively, the compounds where X is fluoro or iodo are prepared by halogen interchange with the corresponding compounds where X is bromo or chloro by heating the latter with sodium fluoride or sodium iodide, respectively, in acetone.

The compound of formula I above where $R_1$ and $R_2$, together with the nitrogen atom to which they are attached, represent an ethyleneimino group is prepared by cyclization of the compounds where $R_1$ is hydrogen and $R_2$ is 2-haloethyl. The reaction is carried out in the presence of an alkali metal hydroxide, for example sodium hydroxide or potassium hydroxide, in an aqueous medium and at temperatures in the range from about 50° C. to about 100° C. The reaction is represented by the equation:

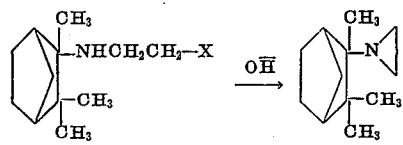

where X has the meanings given above.

The compound of formula I above where $R_1$ is hydrogen and $R_2$ is cyclopropyl methyl is prepared by reduction, with an alkali metal aluminum hydride, of the corresponding compound where $R_2$ is cyclopropylcarbonyl. The reaction is carried out at a temperature in the range from about 0° C. to about 100° C. in an organic solvent inert under the conditions of the reaction, for example tetrahydrofuran, diethyl ether, dibutyl ether, and the like.

The 3-cyclopropylcarbonylamino-2,2,3-trimethylnorcamphane required as an intermediate is in turn prepared by reaction of 3-amino-2,2,3-trimethylnorcamphane with a cyclopropylcarbonyl halide in an organic solvent inert under the conditions of the reaction, for example benzene, toluene, xylene, and the like, and in the presence of an acid-acceptor, which is used to take up the hydrogen halide split out during the course of the reaction. Suitable acid-acceptors are pyridine, N,N-di-methylaniline, or tri-lower-alkylamines. The sequence of reactions just described for the preparation of the 3-cyclopropylmethylamino compound is represented by the equations:

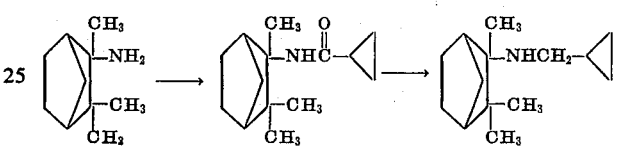

The acid-addition salts of the bases herein described are the form in which the bases are most conveniently prepared for use. The acid moieties or anions in these salt forms are in themselves neither novel nor critical and therefore can be any acid anion or acidlike substance capable of salt formation with the free base form of the compounds. The preferred type of salts are water-soluble pharmacologically acceptable salts, that is, salts whose anions are relatively innocuous to the animal organisms in pharmacological doses of the salts, so that the beneficial physiological properties inherent in the free bases are not vitiated by side effects ascribable to the anions; in other words, the latter do not substantially affect the pharmacological properties inherent in the cations. In practicing the invention, it has been found convenient to form the hydrochloride or hydrogen oxalate salts. However, other appropriate pharmacologically acceptable salts within the scope of the invention are those derived from mineral acids such as hydrobromic acid, hydriodic acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate, and quinate salts, respectively.

Although pharmacologically acceptable salts are preferred, those having toxic anions are also useful. All acid-addition salts are useful intermediates as sources of the free base form even if the particular salt per se is not desired as the final product, as for example when the salt is formed only for the purpose of purification or identification, or when it is used as an intermediate in preparing a pharmacologically acceptable salt by ion-exchange procedures.

The compounds of formula I are hypotensive agents as determined in the renal hypertensive rat using the standard and recognized photoelectric tensometer foot method described by Kersten et al., J. Lab. Clin. Med. 32, 1090 (1947), which procedure is described as follows:

Each compound was administered subcutaneously in the form of the hydrochloride salt in distilled water to groups of three renal hypertensive rats at each of two to four different dose levels graduated at 0.3 to 0.9 logarithmic intervals. The systolic blood pressure was determined for each of the three rats per dose level before medication and at intervals of 1, 2, 4, 6, 24, and 48 hours after medication in each rat at each dose level. For the control readings, the rats were considered hypertensive if the systolic blood pressure was 160 mm. Hg or greater, and for the postmedication readings, the systolic blood pressure was considered within normotensive range at 130 mm. Hg or less. The blood pressure reading for each rat was compared with these two criteria at each interval and judged either normotensive or not normotensive, and the dose reducing the blood pressure to a normotensive level in 50 percent of the animals was defined as the Approximate Effective Dose$_{50}$ (AED$_{50}$);

The compounds can be prepared for use by dissolving or suspending them in aqueous alcohol, propylene glycol or oil solution, or oil-in-water emulsions in the same manner as conventional medicinal substances are prepared. Alternatively, they can be incorporated in unit dosage form as tablets or capsules for oral administration either alone or in combination with suitable adjuvants such as calcium carbonate, starch, lactose, talc, magnesium stearate, gum acacia, and the like. The compounds are administered to any suitable mammalian host in a dose range of 2–20 mg./kg.

The chemical structures of the compounds of the invention are established by their mode of synthesis and are corroborated by infrared and ultraviolet spectra and by the correspondence between calculated values for the elements and values found by chemical analysis.

The following examples will illustrate specific embodiments of the invention without the latter being limited thereto.

EXAMPLE 1

3-(2-Hydroxyethylamino)-2,2,3-trimethylnorcamphane hydrochloride

To a cold solution of 3.06 g. (0.02 mole) of 3-amino-2,2,3-trimethylnorcamphane dissolved in 40 ml. of methanol containing a few drops of water was added 1.2 ml. (0.05mole) of ethylene oxide. The mixture was heated under gentle reflux with magnetic stirring using a solid carbon dioxide-acetone cooled condenser. After several hours reflux, the methanol was removed under reduced pressure, 50 ml. of water was added, and the mixture was extracted with three 100 ml. portions of ether. The combined ether extracts were in turn washed with two 50 ml. portions of water, dried, and evaporated to dryness giving an oil which was dissolved in ether and converted to the hydrochloride salt by addition of ethereal hydrogen chloride. The solid which separated was collected and recrystallized from acetone giving about 1 g. of 3-(2-hydroxyethylamino)-2,2,3-trimethylnorcamphane hydrochloride as colorless crystals, m.p. 197° C.

Anal. Calcd. for $C_{12}H_{23}NO \cdot HCl$: C,61.65; H,10.35; N,5.99; Cl,15.17.

Found: C,61.63; H,10.23; N,6.09; Cl,15.06.

EXAMPLE 2

3-(2-Chloroethylamino)-2,2,3-trimethylnorcamphane hydrochloride

To a solution of 2.22 g. (0.011 mole) of 3-(2-hydroxyethylamino)-2,2,3-trimethylnorcamphane dissolved in 20 ml. of dry pyridine was added 1.2 ml. (0.02 mole) of thionyl chloride. The mixture was allowed to stand for 16 hours in a refrigerator, and the pyridine was then removed by distillation at reduced pressure. The residue was mixed with 100 ml. of water, and the mixture extracted with two 75 ml. portions of chloroform. The combined chloroform extracts were washed several times with water, dried, and evaporated to dryness giving a viscous oil which was dissolved in ether, filtered, and converted to the hydrochloride salt by addition of ethereal hydrogen chloride. The solid which separated was collected and recrystallized from methanol/ether giving 1.32 g. of 3-(2-chloroethylamino)-2,2,3-trimethylnorcamphane hydrochloride as colorless platelets, m.p. 216°–217° C.

Anal. Calcd. for $C_{12}H_{22}NCl \cdot HCl$: C,57.14; H,9.19; N,5.55; Cl,28.11.

Found: C,57.02; H,9.17; N,5.33; Cl,28.11.

EXAMPLE 3

3-(2-Bromoethylamine)-2,2,3-trimethylnorcamphane is prepared by reaction of 3-(2-hydroxyethylamino)-2,2,3-trimethylnorcamphane with phosphorus tribromide in refluxing xylene.

EXAMPLE 4

3-(Ethyleneimino)-2,2,3-trimethylnorcamphane

A mixture of 5.5 g. (0.022 mole) of 3-(2-chloroethylamino)-2,2,3-trimethylnorcamphane hydrochloride in 50 ml. of water was added all at once to a vigorously stirred solution of 7.2 g. (0.18 mole) of sodium hydroxide in 300 ml. of water at 90°–94° C. The mixture was stirred for 1 hour, then cooled, and extracted with three 150 ml. portions of ether. The combined ether extracts were washed with water, dried, and evaporated to dryness, and the oily residue was distilled through a short-path still to give 1.2 g. of 3-(ethyleneimino)-2,2,3-trimethylnorcamphane as a colorless liquid, having a camphorlike odor, b.p. 95°–98° C./2.9 mm.

Anal. Calcd. for $C_{12}H_{N:C}$,80.39; H,11.81; N,7.81.

Found: C,80.47; H,11.92; N,7.86.

EXAMPLE 5

3-Cyclopropylmethylamino-2,2,3-trimethylnorcamphane hydrochloride

To a solution of 2.09 g. (0.02 mole) of cyclopropylcarbonyl chloride in 10 ml. of benzene was added a solution of 3.07 g. (0.02 mole) of 3-amino-2,2,3-trimethylnorcamphane in 10 ml. of benzene and 10 ml. of pyridine. The mixture was heated on a steam bath for about an hour and a quarter, the solvents were then removed by distillation under reduced pressure, and the residue mixed with water and extracted with chloroform. The chloroform extracts were washed, dried and taken to dryness, and the residue recrystallized from heptane giving 2.1 g. of 3-cyclopropylcarbonylamino-2,2,3-trimethylnorcamphane, m.p. 119°–120.5° C.

Anal. Calcd. for $C_{14}H_{23}NO$: C,75.97; H,10.47; N,6.33.

Found: C,75.84; H,10.49; N,6.27.

The product thus obtained (5.73g., 0.026 mole) was dissolved in 60 ml. of ether and added over a period of 15 minutes to a stirred solution of 2.1 g. (0.055 mole) of lithium aluminum hydride in 100 ml. of anhydrous ether, and the mixture heated under reflux for 2 hours. The excess hydride was decomposed by the careful addition of 10.3 ml. of water, and the ether layer was removed by filtration, washed with water, dried, and saturated with gaseous hydrogen chloride. The solid which separated was collected and recrystallized from a methanol/dry ether mixture giving 1.77 g. of 3-cyclopropylmethylamino-2,2,3-trimethylnorcamphane hydrochloride, m.p. 225°–225.2° C.

Anal. Calcd. for $C_{14}H_{25}N \cdot HCl$: C,68.96; H,10.75; N,5.75; Cl,14.54.

Found: C,68.69; H,10.48; N,6.01; Cl,14.42.

I claim:

1. 3-Enthyleneimino-2,2,3-trimethylnorcamphane.
2. The acid addition salts of the compound of claim 5.
3. The acid addition salt of claim 13 wherein said acid is HCl.

* * * * *